W. T. NICHOLS.
REVOLVING SCRAPER.

No. 186,015. Patented Jan. 9, 1877.

Attest
W. J. Baker
L. A. Bunting

Inventor
William T. Nichols
By Coburn & Thacher
Attorneys

UNITED STATES PATENT OFFICE.

WILLIAM T. NICHOLS, OF MAYWOOD, ILLINOIS.

IMPROVEMENT IN REVOLVING SCRAPERS.

Specification forming part of Letters Patent No. 186,015, dated January 9, 1877; application filed September 15, 1876.

*To all whom it may concern:*

Be it known that I, WILLIAM T. NICHOLS, of Maywood, in the county of Cook and State of Illinois, have invented a new and useful Improvement in Revolving Scrapers, which is fully described in the following specification, reference being had to the accompanying drawings, in which—

Figure 1:
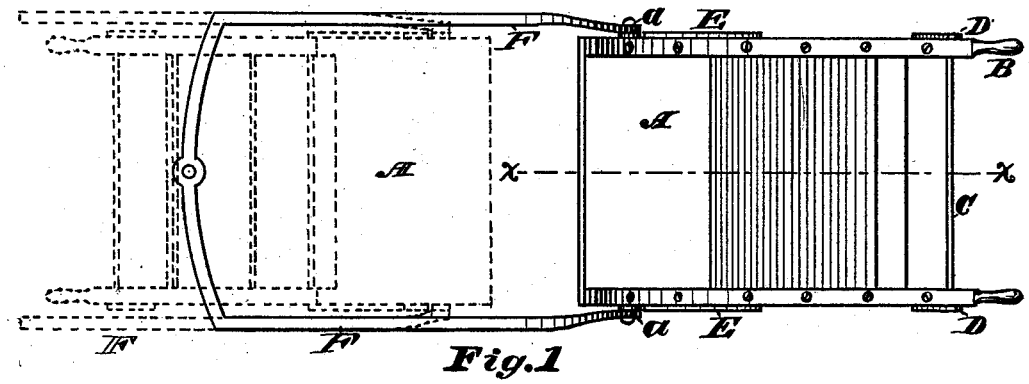
Figure 2:
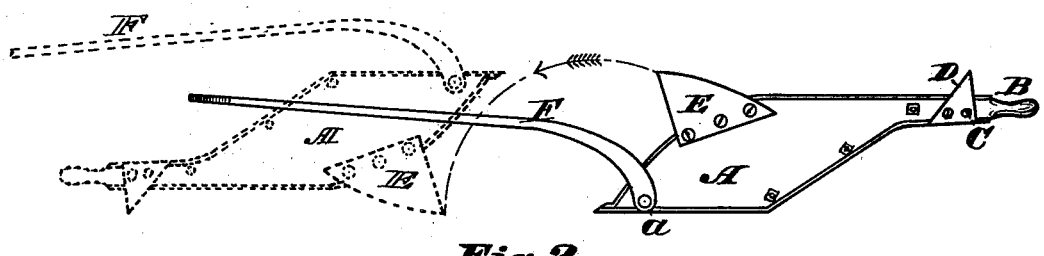
Figure 3:
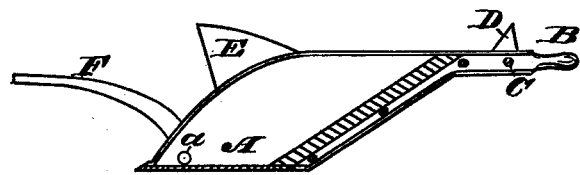

Figure 1 represents a plan view of the scraper, the dotted lines showing it in an inverted position; Fig. 2, a side elevation of the same; and Fig. 3, a cross-section taken on the line *x x*, Fig. 1.

The object of my invention is to provide a scraper of ordinary construction, which is also a revolving scraper, so that all the advantages of both styles of the implement are obtained.

The invention consists in the combination of a scraper having ordinary rigid handles with a bail, constructed so as to permit the scraper to turn over within it; also, in certain stops attached to the sides of the scraper, whereby, in an inverted position, the draft is thrown up so as to complete the revolution of the implement; and also, in special combinations of devices, as will be hereinafter more fully described.

In the drawings, A represents a scoop similar in construction to the the ordinary scoop-scraper; it is pointed, with short handles B projecting from the rear end, and made either in one piece with the sides or rigidly secured to the scoop in some suitable manner. A rod, C, extends from side to side of the scraper, passing through the handles B, and serves to stay the handles, and also as an additional means for managing the implement. Pointed stops or projections D are attached to the handles at the rear of the scraper or any other part of the implement, which may afford a convenient support for these stops at the rear end of the scoop. A similar set of stops or supports, E, are attached to the sides of the scoop, at their upper edges, and near their front ends. These latter stops are somewhat larger than the stops D, and operate as supports, as hereinafter described. A draft-bail F, is attached to the forward end of the scoop by pivotal connections. This bail is rectangular in form, and is of sufficient length to permit the scoop A to be revolved within it, and is attached to the outside of the scoop to permit this operation. The rear ends of the bail are secured and bent downward, as shown in Fig. 2 of the drawings, and are attached to the sides of the scoop at their extreme lower edges, as shown at *a a* in the drawings, and the draft attachment is made at the center of the forward end of the bail. The attachment of the draft-bail lower edges of the scoop and the bend in the rear ends thereof make the line of draft such that the scoop is easily drawn into the earth, and, therefore, can be readily managed with the ordinary short handles, having a short leverage, and this construction enables me to lessen the cost of the revolving scraper by making it in ordinary form and revolving it with the handles attached, instead of having the long handles separate from the scoop and connected to the latter by a catch, or some other device, for connecting the two together and disconnecting at the proper time, and to permit the scoop to revolve independently of the handles.

The operation is as follows: The scoop A is set in the ground and filled in the usual manner and at the proper time is inverted by the handles B. As it turns over in the direction of the arrow in Fig. 2 of the drawings, the stops E strike upon the ground, and as the revolving motion of the scoop is continued the forward end is thrown up, being supported upon the stops E, as shown in dotted lines in Fig. 2 of the drawings. The rear or handle end of the scoop passes down through the bail, and the stops E enter the ground, and thus prevent the drawing forward of the scoop in an inverted position. The draft-points are now elevated so high that the forward draft upon the bail will operate to pull the forward end of the scoop upward and forward, the points D holding it from slipping and acting as a fulcrum, and thus the entire revolution of the scoop is completed automatically, and the implement is ready to be filled again.

It will be noticed that the rear edges of the stops E are curved, so that they form no obstacle to the dragging of the scoop when in an inverted position, as shown in dotted lines of Fig. 2 of the drawings. This scraper is much cheaper and simpler in construction than the revolving scraper in general use, in which the handles are independent of the scoop, the latter alone revolving. There are few parts, and these are of ordinary construction. There are no attaching and detaching devices between the scoop and handles, which are always liable to become disarranged, and the entire cost is but very little more than that of the old-fashioned one which has been in use for so many years.

Having thus described my invention, what I claim as new, and desire to secure by Letters Patent, is—

1. The revolving scoop A, provided with a single set of handles, B, rigidly attached thereto, in combination with the pointed stops D, and the draft-bail F, pivoted to the scoop at its outside lower edge, substantially as set forth.

2. The supporting-stops E, attached to the sides of the scoops, at the front end thereof, whereby the forward end of the latter is elevated when in an inverted position, substantially as and for the purpose set forth.

3. In a revolving scraper, the combination of the scoop A, stops D, supporting-pieces E, and draft-bail F, all constructed and operating substantially as described.

WILLIAM T. NICHOLS.

Witnesses:
L. A. BUNTING,
E. S. LLOYD.